US008645243B1

(12) United States Patent
Billman

(10) Patent No.: US 8,645,243 B1
(45) Date of Patent: Feb. 4, 2014

(54) SYSTEMS AND METHODS FOR A RETIREMENT LOCATION ADVISOR

(75) Inventor: Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 939 days.

(21) Appl. No.: 12/251,496

(22) Filed: Oct. 15, 2008

(51) Int. Cl.
*G06Q 40/00* (2012.01)

(52) U.S. Cl.
USPC .............................................. 705/35; 705/36

(58) Field of Classification Search
CPC ...................................................... G06Q 40/00
USPC ...................................................... 705/35, 36
See application file for complete search history.

(56) References Cited

U.S. PATENT DOCUMENTS

| | | | |
|---|---|---|---|
| 7,343,309 B2 | 3/2008 | Ogawa et al. | |
| 7,469,214 B2 | 12/2008 | Martin et al. | |
| 7,716,156 B1 | 5/2010 | Eubank et al. | |
| 7,908,196 B2 | 3/2011 | Bevacqua, Jr. | |
| 2002/0038280 A1 | 3/2002 | Levy | |
| 2002/0073005 A1* | 6/2002 | Welnicki et al. | 705/35 |
| 2003/0078815 A1 | 4/2003 | Parsons | |
| 2003/0229649 A1 | 12/2003 | Herrero | |
| 2006/0041663 A1 | 2/2006 | Brown et al. | |
| 2006/0253324 A1 | 11/2006 | Miller | |
| 2007/0244777 A1 | 10/2007 | Torre et al. | |
| 2007/0288399 A1* | 12/2007 | Reynolds et al. | 705/36 R |
| 2008/0016051 A1* | 1/2008 | Schiller | 707/5 |
| 2008/0103823 A1 | 5/2008 | Papa | |
| 2008/0150963 A1* | 6/2008 | Stambaugh | 345/629 |
| 2009/0240550 A1 | 9/2009 | McCarty | |
| 2009/0313030 A1* | 12/2009 | Karmel et al. | 705/1 |

OTHER PUBLICATIONS

Cassidy, Thomas M.: "How to Choose Retirement Housing (2006)", 1 page.

* cited by examiner

*Primary Examiner* — Elda Milef
(74) *Attorney, Agent, or Firm* — Brooks, Cameron & Huebsch, PLLC

(57) ABSTRACT

A system for providing retirement location advice may comprise at least one subsystem that receives location characteristic preference input from a customer, at least one subsystem that finds possible locations that a customer could afford during their retirement based on a retirement plan of the customer and the location characteristic preference input of the customer, and at least one subsystem that displays the possible locations found.

18 Claims, 5 Drawing Sheets

SYSTEMS AND METHODS FOR A RETIREMENT LOCATION ADVISOR

CROSS REFERENCE TO RELATED APPLICATIONS

The patent applications below (including the present patent application) are filed concurrently and share a common title and disclosure, each of which is hereby incorporated herein by reference in its entirety:

U.S. patent application Ser. No. 12/251,498, filed on Oct. 15, 2008; and

U.S. patent application Ser. No. 12/251,502, filed on Oct. 15, 2008.

BACKGROUND

Choosing a place to retire can be difficult, especially during economically hard times. Retiring individuals are becoming more concerned about how far they can stretch their money while maintaining an acceptable standard of living during retirement. Choosing an affordable place to retire before actual retirement may often be complicated due to the fact that current income and financial status may not be applicable during retirement. Even if a retirement plan is in place, a person may still need help in finding locations to retire based on the retirement plan and other preference factors.

In this regard, there is a need for systems and methods that overcome shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for a retirement location advisor are provided. For several embodiments, a system for providing retirement location advice may comprise at least one subsystem that receives location characteristic preference input from a customer, at least one subsystem that finds possible locations that a customer could afford during their retirement based on a retirement plan of the customer and the location characteristic preference input of the customer, and at least one subsystem that displays the possible locations found.

Other features and embodiments are described below.

BRIEF DESCRIPTION OF THE DRAWINGS

Systems and methods for a retirement location advisor are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
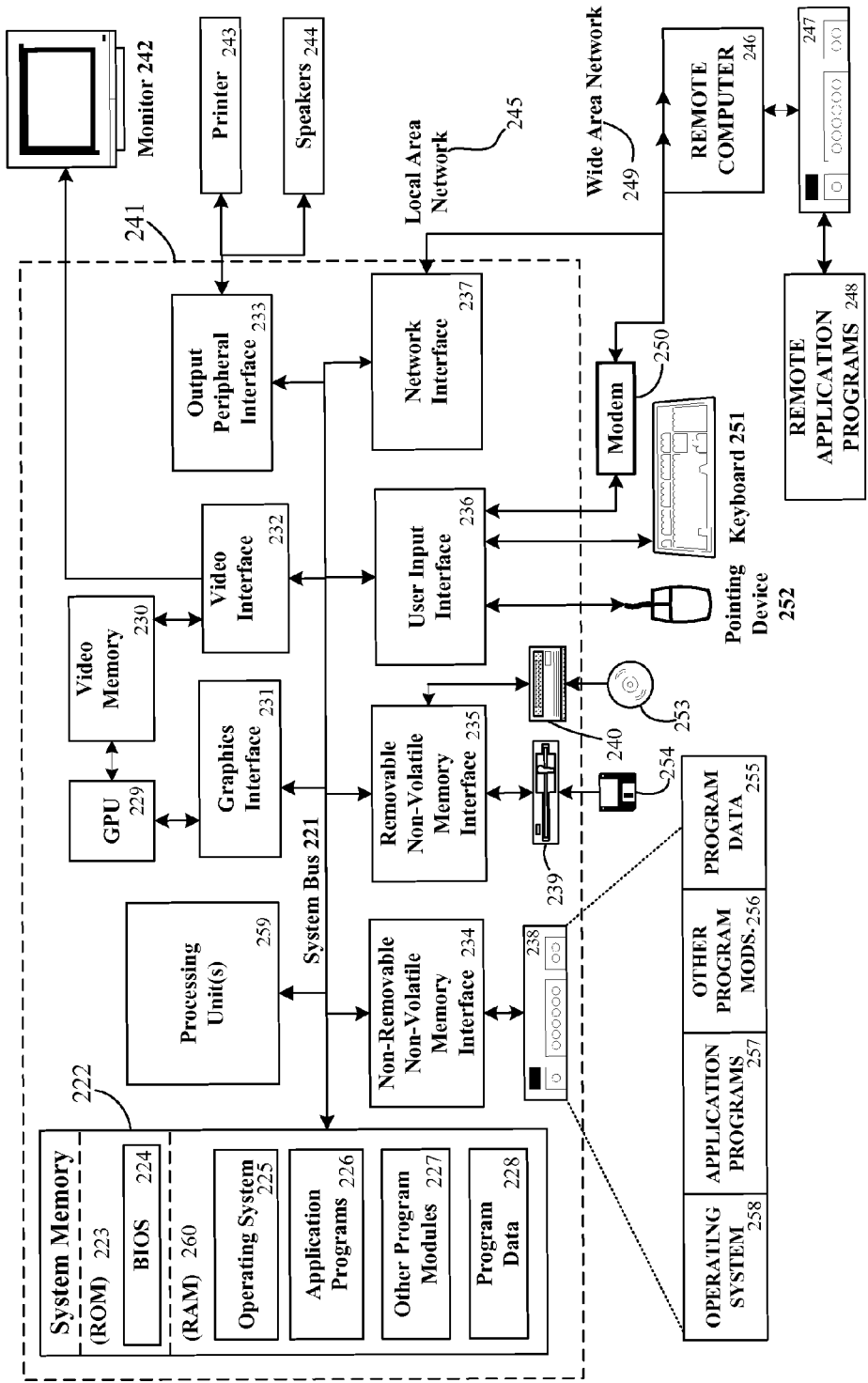
FIG. 1 is a block diagram representing an exemplary computing device suitable for use in conjunction with implementing a retirement location advisor.

Referring next to FIG. 1, shown is a block diagram representing an exemplary computing device suitable for use in conjunction with implementing the processes described below. For example, the computer-executable instructions that carry out the processes and methods for a retirement location advisor may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a computer game console may also include those items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU), video memory 229, and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program (s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
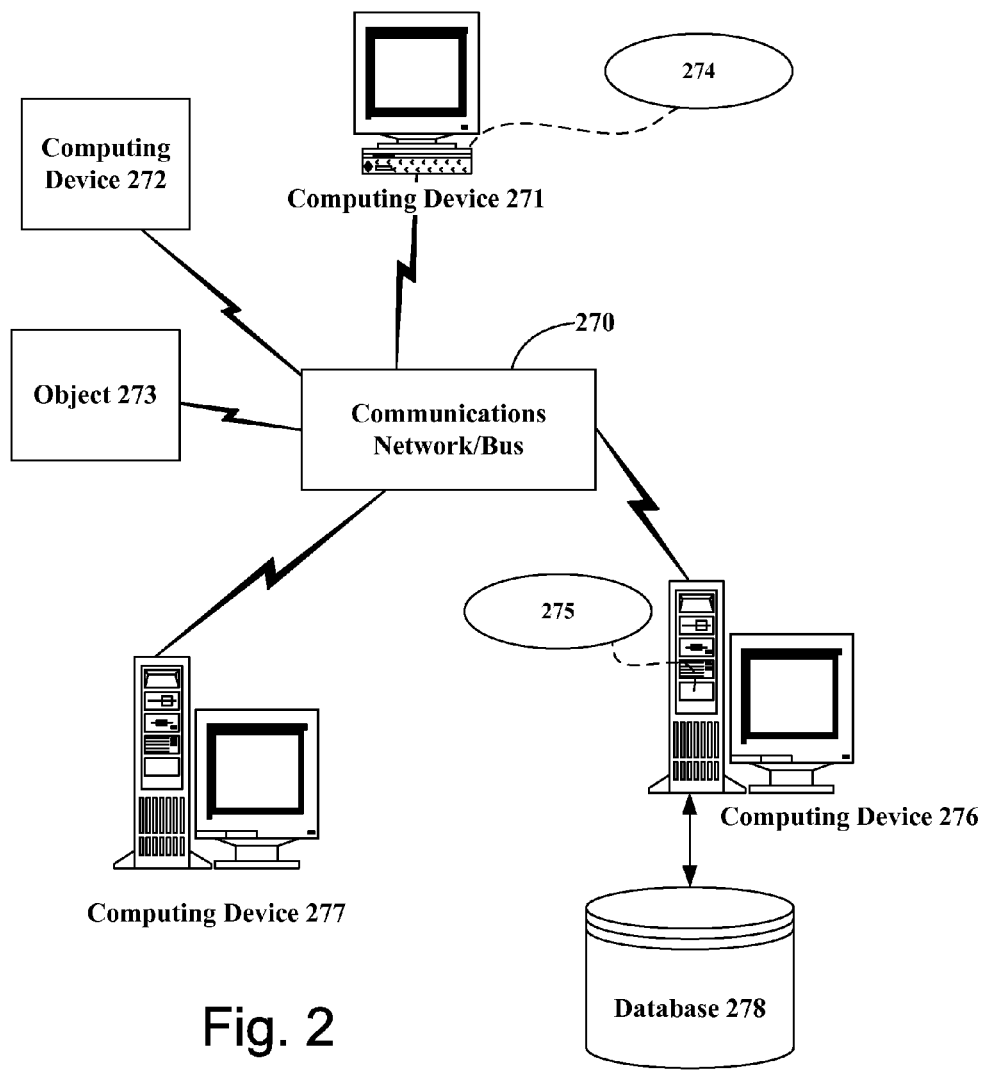
FIG. 2 illustrates an exemplary networked computing environment in which many computerized processes may be implemented to perform providing a retirement location advisor.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing a retirement location advisor. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address.

Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
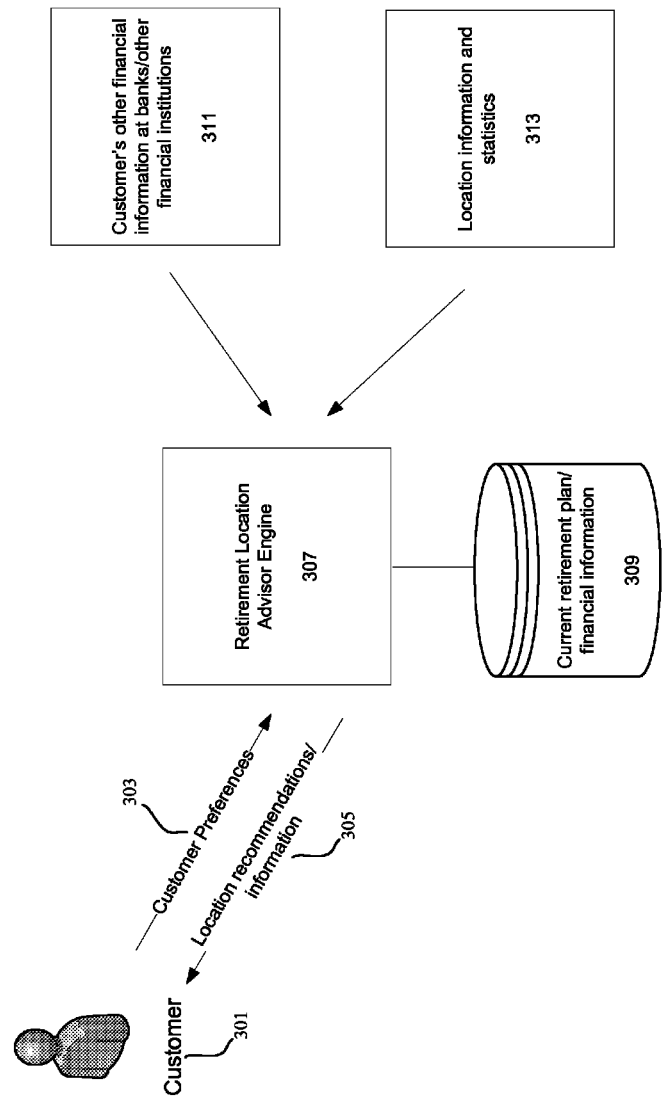
FIG. 3 is a block diagram illustrating an example of a retirement location advisor system.

Referring next to FIG. 3, shown is a block diagram illustrating an example of a retirement location advisor system. Shown is an example customer 301, example, customer preference input 303, example location recommendations/information, an example retirement location advisor engine 307, example stored current retirement plan/financial information 309, an example of the customer's other financial information 311 at banks and other financial institutions, and example of location information and statistics 309. The customer 301 may be located remotely from the retirement location advisor engine 307 and communicate customer preferences 303 regarding desired location characteristics remotely to the retirement location advisor engine 307 over any communications network, such as, for example, over the Internet. The retirement location advisor engine 307 may have a current retirement plan and other financial information 309 of the customer 301 stored locally at or remotely from the retirement location advisor engine 307. The retirement location advisor engine 307, for example, may have access to a retirement plan or other financial information 309 of the customer 301 that the customer 301 had previously provided. For example, the retirement plan and other financial information 309 may comprise but is not limited to: information on amounts of money the customer 301 has currently saved for retirement, projected future contributions for retirement, specific savings accounts, Individual Retirement Account (IRA) information, 401(k) information, life insurance accounts, trust accounts, assets, companies owned, stocks and brokerage accounts, other investment account information, and projections on returns from retirement and investment account, projected disbursements from retirement and investment accounts, plans for selling assets, plans for withdrawing from accounts, projected or planned future income, etc.

Location information and statistics 311 may be communicated to the retirement location advisor engine 307 from local or remote servers, information stores, $3^{rd}$ party systems, other banks and financial service institutions, information aggregation services, etc., and may be accessed by the retirement location advisor engine 307 in an automated fashion over any communications network. Such information may comprise retirement information as described above and/or other financial information of the customer 301 relevant to making recommendations of retirement locations to the customer 301.

Likewise, location information and statistics 313 may be communicated to the retirement location advisor engine 307 from local or remote servers, information stores, $3^{rd}$ party systems, real estate information service providers, geographic and map information service providers, etc., and may be accessed by the retirement location advisor engine 307 in an automated fashion over any communications network. Such location information 313 and statistics may comprise but is not limited to: cost of living statistics and on-line reports, weather and climate statistics, population statistics, census statistics, demographic statistics, crime reports, mortgage rates, rental rates and housing prices in on homes (of varying sizes), local things to do, auto and homeowner insurance costs, other customer-indicated types of information, etc.

Location recommendations and associated information 305 may be communicated to the customer 301 over any aired or wireless communications network, such as, for example, over the Internet.

Figure 4:
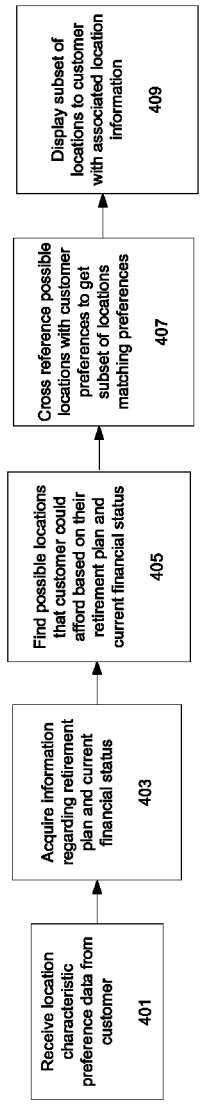
FIG. 4 is a flow chart illustrating an example process for a retirement location advisor.

Referring next to FIG. 4, shown is a flow chart illustrating an example process for a retirement location advisor. First, the retirement location advisor system may receive (401) location characteristic preference data from a customer. This location preference data may be in response to specific prompts, menus and choices given by the retirement location advisor system through a user interface. This information may comprise, but is not limited to: information regarding cost of living, things to do in a particular area, geographical preferences, population statistics, distance from large city, weather and climate statistics, crime rates, educational statistics, demographic statistics, etc. For example, a customer may indicate that they want to live in a community limited to a certain range of crime rate and having a certain range of rainfall each year, and is no further than a specified distance from a large city (which also may be defined by the customer).

The retirement location advisor then acquires (403) information regarding a retirement plan and current financial status of the customer through various possible channels as described above, for example. In an automated fashion, the retirement location advisor then finds (405) possible locations that customer could afford based on their retirement plan and their current financial status. This may be accomplished, for example, by comparing cost of living location information previously acquired by the retirement location advisor on various locations throughout the world to the projected financial situation of the customer at the time of retirement indicated by the customer in their retirement plan.

The retirement location advisor then cross references (407) the resulting possible affordable locations with customer preferences to get subset of locations matching one or more preferences indicated by the customer. The retirement location advisor may then display (409) this subset of locations to the customer with associated location information and/or financial projections. These displayed locations may also be in a sorted list of locations that best match the customer's preferences, with the locations that most match the customer's preferences at the top of the list. A percentage of how well each displayed location matches the customer's preferences may also be shown.

Figure 5:
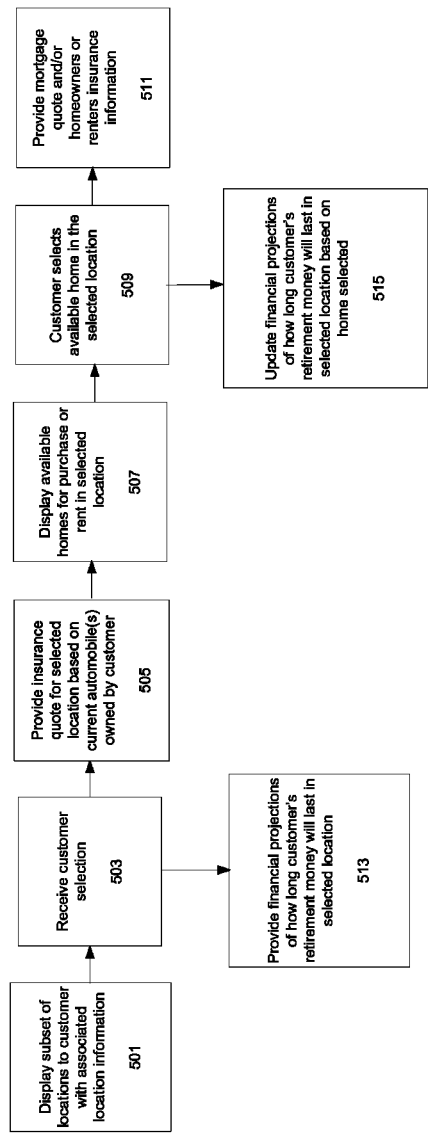
FIG. 5 is a flow chart illustrating an example process when a customer selects a location provided by the retirement location advisor.

Referring next to FIG. 5, shown is a flow chart illustrating an example process when a customer selects a location provided by the retirement location advisor. The retirement location advisor first displays (501) a subset of locations to the customer with associated location information and financial projections. Next, a selection of a particular displayed location is received (503) by the retirement location advisor. The selection may be made by the customer clicking on a link, button, voice command, or by other selection mechanism through an interface of the retirement location advisor.

The retirement location advisor then provides (513) financial projections of how long the customer's retirement money will last in a selected location. This may be accomplished, for example, by accessing the customer's current retirement plan and other financial data as described above. For example, the financial projections may comprise an estimate on how long the customer's retirement money will last if they chose to stay at a particular location displayed throughout their retirement. Also, the retirement location advisor may provide (505) an insurance quote for a selected location based on current automobile(s) owned by customer. For example, the retirement location advisor may have ready access to the current automobiles owned by the customer if the retirement location advisor is a system of the customer's auto insurance provider or if the customer's auto insurance provider communicates automobile information to the retirement location advisor over a communications network such as the Internet or other network.

The retirement location advisor may also display (507) available homes for purchase or rent in a selected location. The customer may then select (509) an available home in the selected location. The retirement location advisor may then update (515) financial projections of how long the customer's retirement money will last in selected location based on home selected and display this updated information. Also, the retirement location advisor may provide (511) a mortgage quote and/or homeowners or renters insurance information for the selected home. This information may also be displayed with or separately from the updated financial projections. Also, the financial projections may be updated and displayed again to account for a specific mortgage quote and/or insurance policy selected by the customer.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although embodiments been described herein with reference to particular means, and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A system for providing retirement location advice comprising:
    a processor; and
    a memory coupled to the processor, wherein the memory is configured to store a set of computer-readable instructions executable by the processor to:
    receive location characteristic preference input from a customer;
    find possible locations that a customer could afford during their retirement based on a retirement plan of the customer and the location characteristic preference input of the customer;
    determine a matching percentage associated with each of the possible locations found based on the location characteristic preference input of the customer;
    determine an insurance quote based on an interest in property held by the customer and the location characteristic preference input of the customer;
    display the possible locations found, the matching percentages associated with each of the possible locations found, and the insurance quote determined;
    receive a selection of one of the possible locations found;
    display available homes associated with the selected one of the possible locations found;
    receive a selection of one of the available homes; and
    display a financial projection of the customer based on the retirement plan, the selected one of the possible locations found, and the selected one of the available homes.

2. The system of claim 1 further comprising instructions to acquire information regarding the retirement plan of a customer before finding of possible retirement locations for the customer.

3. The system of claim 1 wherein the instructions to find possible locations comprise:
    instructions to compare cost of living location information to a financial information indicated in the retirement plan to create a set of locations the customer may be likely to afford during retirement; and
    instructions to cross-reference location information with customer preferences to get a subset of locations matching preferences.

4. The system of claim 1 wherein the location characteristic preference input comprises one or more of the following types of information: information regarding cost of living, things to do in a particular area, geographical preferences, population statistics, distance from large city, weather and climate statistics, crime rates, educational statistics, demographic statistics.

5. The system of claim 1 wherein the retirement plan of the customer comprises information related to one or more of the following: amounts of money the customer has currently saved for retirement, projected future contributions for retirement, specific savings accounts, Individual Retirement Account (IRA) information, 401(k) information, life insurance accounts, trust accounts, assets, companies owned, stocks and brokerage accounts, other investment account information, and projections on returns from retirement and investment account, projected disbursements from retirement and investment accounts, plans for selling assets, plans for withdrawing from accounts, projected or planned future income.

6. The system of claim 1 further comprising instructions to acquire financial information regarding the customer in addition to that included in the retirement plan in order to aid in the finding of possible locations that a customer could afford during their retirement.

7. A method for providing retirement location advice comprising:
    receiving location characteristic preference input from a customer;
    finding possible locations that a customer could afford during their retirement based on a retirement plan of the customer and the location characteristic preference input of the customer;
    using a computer processor to determine a matching percentage associated with each of the possible locations found based on the location characteristic preference input of the customer;
    determining an insurance quote based on an interest in property held by the customer and the location characteristic preference input of the customer;
    displaying, by a computing device, the possible locations found, the matching percentages associated with each of the possible locations found, and the insurance quote determined;
    receiving a selection of one of the possible locations found;
    displaying available homes associated with the selected one of the possible locations found;
    receiving a selection of one of the available homes; and
    displaying a financial projection of the customer based on the retirement plan, the selected one of the possible locations found, and the selected one of the available homes.

8. The method of claim 7 further comprising acquiring information regarding the retirement plan of a customer before finding of possible retirement locations for the customer.

9. The method of claim 7 wherein the finding possible locations comprises:
- comparing cost of living location information to a financial information indicated in the retirement plan to create a set of locations the customer may be likely to afford during retirement; and
- cross referencing location information with customer preferences to get a subset of locations matching preferences.

10. The method of claim 7 wherein the location characteristic preference input comprises one or more of the following types of information: information regarding cost of living, things to do in a particular area, geographical preferences, population statistics, distance from large city, weather and climate statistics, crime rates, educational statistics, demographic statistics.

11. The method of claim 7 wherein the retirement plan of the customer comprises information related to one or more of the following: amounts of money the customer has currently saved for retirement, projected future contributions for retirement, specific savings accounts, Individual Retirement Account (IRA) information, 401(k) information, life insurance accounts, trust accounts, assets, companies owned, stocks and brokerage accounts, other investment account information, and projections on returns from retirement and investment account, projected disbursements from retirement and investment accounts, plans for selling assets, plans for withdrawing from accounts, projected or planned future income.

12. The method of claim 7 further comprising acquiring financial information regarding the customer in addition to that included in the retirement plan in order to aid in the finding of possible locations that a customer could afford during their retirement.

13. A non-transitory computer readable medium for providing retirement location advice comprising computer readable instructions for:
- receiving location characteristic preference input from a customer;
- finding possible locations that a customer could afford during their retirement based on a retirement plan of the customer and the location characteristic preference input of the customer;
- determining a matching percentage associated with each of the possible locations found based on the location characteristic preference input of the customer;
- determining an insurance quote based on an interest in property held by the customer and the location characteristic preference input of the customer;
- displaying the possible locations found, the matching percentages associated with each of the possible locations found, and the insurance quote determined;
- receiving a selection of one of the possible locations found;
- displaying available homes associated with the selected one of the possible locations found;
- receiving a selection of one of the available homes; and
- displaying a financial projection of the customer based on the retirement plan, the selected one of the possible locations found, and the selected one of the available homes.

14. The computer readable medium of claim 13 further comprising computer readable instructions for acquiring information regarding the retirement plan of a customer before finding of possible retirement locations for the customer.

15. The computer readable medium of claim 13 wherein the computer readable instructions for finding possible locations comprises computer readable instructions for:
- comparing cost of living location information to a financial information indicated in the retirement plan to create a set of locations the customer may be likely to afford during retirement; and
- cross referencing location information with customer preferences to get a subset of locations matching preferences.

16. The computer readable medium of claim 13 wherein the location characteristic preference input comprises one or more of the following types of information: information regarding cost of living, things to do in a particular area, geographical preferences, population statistics, distance from large city, weather and climate statistics, crime rates, educational statistics, demographic statistics.

17. The computer readable medium of claim 13 wherein the retirement plan of the customer comprises information related to one or more of the following: amounts of money the customer has currently saved for retirement, projected future contributions for retirement, specific savings accounts, Individual Retirement Account (IRA) information, 401(k) information, life insurance accounts, trust accounts, assets, companies owned, stocks and brokerage accounts, other investment account information, and projections on returns from retirement and investment account, projected disbursements from retirement and investment accounts, plans for selling assets, plans for withdrawing from accounts, projected or planned future income.

18. The computer readable medium of claim 13 further comprising computer readable instructions for acquiring financial information regarding the customer in addition to that included in the retirement plan in order to aid in the finding of possible locations that a customer could afford during their retirement.

* * * * *